United States Patent

Serlin

[15] 3,661,617
[45] May 9, 1972

[54] TREATMENT OF GLASS CLOTH

[72] Inventor: Irving Serlin, Springfield, Mass.
[73] Assignee: Monsanto Company, St. Louis, Mo.
[22] Filed: Jan. 29, 1969
[21] Appl. No.: 795,046

[52] U.S. Cl. .............................. 117/54, 117/63, 117/76 T, 117/126 GN, 117/126 GB
[51] Int. Cl. ................................ B22b 17/04, C03c 25/02
[58] Field of Search ................ 117/54, 63, 126 GS, 126 GB, 117/126 GN; 28/76; 57/140 G

[56] References Cited

UNITED STATES PATENTS 3,307,967  3/1967  Vanderbilt et al. ............... 117/126 X
3,455,725  7/1969  Jex et al. ............................ 117/126 X Primary Examiner—William D. Martin
Assistant Examiner—D. Cohen
Attorney—William J. Farrington, Arthur E. Hoffman and H. B. Roberts

[57] ABSTRACT

Disclosed herein is a method for the treatment of aminosilane-sized hard drape glass cloth used in the preparation of resin impregnated composites which comprises treating the cloth with water prior to the fabrication of the composite. Polyimide resin impregnated laminates prepared from glass cloth treated with water in accordance with the present invention show a significant increase in the flexural strength after aging over laminates prepared from hard drape cloth which have not been treated with water.

7 Claims, No Drawings

TREATMENT OF GLASS CLOTH

BACKGROUND OF THE INVENTION

1. Field of the Invention

The present invention relates to a method for the treatment of glass cloth used in the preparation of resin impregnated composites.

More particularly, the present invention relates to a method for treating glass cloth which is to be impregnated with a polyimide forming resin and fabricated into a polyimide composite.

2. Description of the Prior Art

The use of glass cloth as a reinforcing element in resin impregnated composites is well known to those skilled in the art. The glass cloth is commonly impregnated with a synthetic resin such as epoxies, polyesters, polycarbonates, phenolics, polyamides, polyamide-imides, polyamide acids, polyimide forming varnishes, etc. The resin impregnated glass cloth is then fabricated into composites which are used in many varied applications. Laminates prepared in this manner have good structural strength and are widely used in many varied applications.

Especially important are the polyimide resin impregnated glass cloth composites. These composites are well known for their excellent thermal and electrical insulation properties. Moreover, when properly prepared, these materials exhibit excellent thermal stability after prolonged exposures at elevated temperatures. Because of their excellent properties these composites find widespread use in the aeronautical and aerospace industries as structural components in air craft and space vehicles.

The glass cloth used in the preparation of composites or laminates is conventionally treated with a coupling agent or finish which enhances bondability of the resin to the glass fabric. One such coupling agent or finish which is used widely in the treatment of glass fabric are the amino silane compounds which may be generally represented as follows:

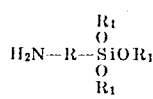

wherein R is selected from the groups selected from alkyl of from one to ten carbon atoms; aryl of from six to 16 carbon atoms; and alkaryl of from seven to 24 carbon atoms wherein the alkyl groups contain from one to four carbon atoms; and wherein $R_1$ is selected from the group consisting of alkyl of from one to eight carbon atoms; aryl of from six to 16 carbon atoms; and alkaryl of from seven to 24 carbon atoms wherein the alkyl groups contain from one to 4 carbon atoms.

Examples of the foregoing compounds would include amino methyl trimethoxy silane; amino methyl triethoxy silane; amino methyl tripropyloxy silane; amino methyl triphenoxy silane; amino methyl tritolyloxy silane; amino ethyl trimethoxy silane; amino ethyl triethoxy silane; amino ethyl tripropyloxy silane; amino ethyl triphenoxy silane; amino propyl trimethoxy silane; amino propyl triethoxy silane; amino propyl tripropyloxy silane; amino phenyl triethoxy silane; amino phenyl triphenoxy silane; amino tolyl triethoxy silane; amino tolyl triphenoxy silane; etc.

The amino-silane finish is applied to the glass fabric from a bath which comprises an aqueous solution of the amino-silane and a polyol such as glycerine or ethylene glycol. The amino-silane cloth is then heat cured at moderate temperatures. When the finish is properly applied and cured, the resulting glass cloth has a soft drape and a surface which enhances the bondability of the impregnating resin. However, if the finish is not properly applied and/or cured the glass cloth has a hard hand or drape. Hard drape glass cloth feels hard and stiff and lacks the velvety or satiny feeling of soft drape glass cloth. When creased, hard drape glass cloth has a tendency to stay creased whereas the soft drape cloth has greater resiliency and tends to return to its original shape. Moreover, hard drape cloth is not wet as readily by the impregnating resin as is soft drape cltoh. Consequently, the bondability of the impregnating resin to the hard drape glass cloth is adversely affected. Furthermore, hard drape cloth detracts from the heat aging stability of the composites. Properties such as flexural strength of laminates prepared from hard drape cloth and polyimide resins are significantly inferior to the same properties in laminates made from soft drape cloth after aging for prolonged period at elevated temperatures.

The phenomenon of hard drape in glass cloth which has been treated with a finish may be apparent immediately after its manufacture. On the other hand, the hard drape characteristic may set in upon aging. In certain instances the hard drape characteristic may set in within a few weeks of manufacture. This hard drape characteristic is unpredictable and with the same lot of treated glass cloth, even the same roll, the cloth may have sections with hard drape while other sections in the same lot or roll have the more desirable soft drape.

As mentioned above, laminates prepared from polyimide resins and hard drape cloth have some physical properties which are decidedly inferior to the properties of the laminates made with soft drape cloth. Consequently, the utility of the hard drape cloth is severely limited even to the extent that it is unsuitable for use in certain applications requiring polyimide composites that must withstand prolonged periods of time at elevated temperatures.

The present invention solves some of the problems encountered in the prior art in regard to the use of hard drape glass cloth.

The present invention allows the use of hard drape glass cloth in certain applications in which the hard drape cloth was heretofore unsuitable. Therefore, by extending the utility of hard drape glass cloth the present invention allows significant cost savings.

Furthermore, polyimide resin impregnated laminates prepared from hard drape cloth which has been treated in accordance with the teaching of the present invention exhibit flexural strengths which are decidedly superior to laminates prepared from hard drape cloth that has not been treated in accordance with the practice of this invention.

SUMMARY OF THE INVENTION

The present invention is related to a method for the treatment of amino silane finished hard drape glass cloth which comprises treating the cloth with water prior to using the cloth in the fabrication of resin impregnated composites.

The present invention makes it possible to upgrade hard drape glass cloth to the point where it is suitable for use in the preparation of polyimide composites used in applications requiring a high degree of flexural strength.

The present invention solves problems previously existent in the prior art by extending the usefulness of hard drape glass cloth and improving some of the physical properties of resin impregnated composites prepared from hard drape glass cloth which has been treated in accordance with the practice of this invention.

Thus, the present invention can be used to upgrade the performance of laminates prepared from hard drape cloth and to effect significant cost savings by providing a method which will enable the utilization of heretofore undesirable material.

It is an object of this invention to provide a method for treating hard drape glass cloth.

It is another object of this invention to provide polyimide resin impregnated glass cloth with improved physical properties.

It is another object of this invention to provide a method for improving the flexural strength of polyimide resin impregnated composites prepared from a hard drape glass cloth reinforcing element.

DESCRIPTION OF THE PREFERRED EMBODIMENTS

The foregoing and other objects are obtained by a process which comprises:

1. selecting a hard drape glass cloth which has been previously finished with an amino silane finish,
2. treating the glass cloth with water at temperatures of from 180° C. to 5° C.; and then
3. drying the glass cloth.

The preferred method of treating the hard drape glass cloth with water in accordance with the practice of this invention is by dipping or soaking the cloth in a water bath. Alternately, the water may be introduced onto the glass cloth by spraying, splashing or allowing steam to condense onto the cloth.

The temperature of the water used to treat the glass cloth is not critical. However, shorter treating times are required when using water at elevated temperatures. Treating times as low as 2 minutes may be used with super heated water, i.e., by treating the glass cloth in pressure vessels at super atmospheric pressures wherein the water temperature is greater than 100° C. Pressures up to 5,000 psi can be used to obtain water temperatures up to 180° C.

The following examples are set forth in illustration of this invention and should not be construed as limitations thereof. Unless otherwise indicated, all parts and percentages given are by weight.

EXAMPLE 1 (CONTROL)

This control example illustrates the poor flexural strength that is obtained in laminates prepared from a hard drape cloth that has not been subjected to a water treatment in accordance with the practice of the present invention.

The cloth used is commercially available glass cloth finished with a gamma amino propyl triethoxy silane finish which is designated as Style 181E-A1100 (soft). The glass cloth is further characterized as having undesirable hard drape. The resin which is used to impregnate the glass cloth is polyimide forming varnish which is a 60 percent solids solution of equimolar amounts of the diethyl ester of benzophenone tetracarboxylic acid and meta-phenylene diamine in N-methyl pyrrolidone which is prepared according to the general teaching of U.S. Pat. No. 3,347,808.

The laminates are prepared by dipping panels of the hard drape glass cloth into the polyimide forming varnish, passing the treated cloth through squeeze rollers and then maintaining them on racks in a forced draft air oven at 120° C. (245° F.) for 90 minutes. This "B"-staged impregnated cloth has a resin content of about 43 percent and a volatiles content of about 6.8 percent. Four inch squares of this impregnated cloth are laid up into a 12 ply laminate which is pressed for 1 hour at 316° C. and 250 psi.

The laminates are post-cured by heating for 4 hour periods at each of the following temperatures: 200° C., 225° C., 250° C., 300° C., and 372° C.

The laminates are then cut into 1 × 4 inch test specimens which are aged for 100 hours at 700° F. Duplicate test specimens are tested for flexural strength according to ASTM procedure D-790.

The laminates of this example are found to have an average flexural strength after aging at 700° F. of 6,800 psi.

EXAMPLE 2

This example illustrates the improved flexural strength which is obtained in laminates wherein the glass cloth is subjected to a water treatment in accordance with the practice of the present invention.

Hard drape glass cloth of the same lot used in example 1 is soaked in boiling water for 30 minutes and then dried in a circulating air oven for 15 minutes at 105° C.

The cloth is then impregnated, fabricated into a laminate and tested for flexural strength according to the procedures set forth in example 1.

The laminates of this example are found to have an average flexural strength after aging at 700° F. of 21,000 psi.

EXAMPLE 3

Example 2 is repeated here except that the hard drape glass cloth of the same lot used in example 1 is soaked in water at room temperature for 2 hours. The glass cloth is then dried in a circulating air oven for 15 minutes at 105° C.

The water treated glass cloth is then impregnated with the polyimide forming varnish, fabricated into a laminate and tested for flexural strength according to the procedures of example 1.

The laminates of this example are found to have an average flexural strength after aging at 700° F. of 14,900 psi.

EXAMPLE 4

Example 3 is repeated here except that the glass cloth is soaked in water at room temperature for 24 hours prior to the preparation of the laminate.

The resulting laminates are found to have an average flexural strength after aging at 700° F. of 21,700 psi.

For comparison purposes the flexural strength data on the laminates prepared in the foregoing examples are tabulated in Table 1 below:

TABLE 1

Flexural Strength Data on Examples 1 to 4

| Example | Time (hr.) | Temp. °C. | Flexural strength (psi) after aging 100 hours at 700° F. |
|---|---|---|---|
| 1 (Control) | – | – | 6,800 |
| 2 | 0.5 | 100 | 21,000 |
| 3 | 2 | 25 | 14,900 |
| 4 | 24 | 25 | 21,700 |

The data in the foregoing table clearly illustrates the significant improvement in the flexural strength that is obtained in polyimide glass cloth composites wherein the hard cloth is subjected to a water treatment in accordance with the teachings of the present invention.

A comparison of examples 1 and 2 indicates that a threefold increase in flexural strength is achieved in example 2 which uses a hard drape cloth which has been soaked for 30 minutes in boiling water.

Examples 3 and 4 indicate that the temperature of the water employed in the treating process is below 100° C. Longer treating times are required in order to obtain the same degree of improvement that is realized when using water temperatures of 100° C. or higher.

As stated above, the water treatment time will vary with the temperature of the water and the degree of improvement that is desired. In general a water treatment time of at least 2 minutes should be used. No significant advantage is realized when using treating times in excess of 96 hours. Thus, water temperatures of from 180° C. to 0° C. are used for times of from 2 minutes to 96 hours, respectively. Prolonged treatment of the glass cloth at temperatures above 180° C. should be avoided in order to prevent deterioration of the finish on the glass cloth as well as deterioration of the cloth itself.

From the foregoing, those skilled in the art will readily recognize the time - water temperature relationship which is used for the water treatment of the hard drape glass cloth in order to enjoy the benefits of the present invention.

Cloth treated according to the procedures of the present invention may be used immediately in the preparation of polyimide composites or it may be stored for prolonged periods for use at a later time. The treatment described can be used on glass cloth with varying degrees of hard drape. That is, the water treatment can be used on glass cloth which has fully set into a hard drape condition as well as on glass cloth which is in the incipient stages of acquiring the hard drape characteristic.

Glass cloth treated in accordance with the present invention can be used in a wide variety of polyimide imide resin impregnated composites. In addition to the structural laminates described in the working examples, the treated glass cloth can be used in honeycomb structures, as scrims in adhesive applications and as the reinforcing member for polyimide foams; etc.

The preferred glass cloth for use in polyimide impregnated structural laminates is the type designated as Style 181E-A1 100 (soft). In this designation "181" refers to the weave and the letter "E" stands for electrical grade cloth. "A1100" is the designation for a gamma aminopropyl triethoxy silane finish, while the expression "(soft)" is used to indicate that the cloth was intended to have a soft drape. However, as pointed out above, the undesirable hard drape characteristic all too frequently sets into glass cloth which was originally intended to have a soft drape.

As shown in the working examples, glass cloth of this type, designated Style 181E-A1100 (soft) which has acquired a hard drape characteristic, can be treated according to the procedures of the present invention and used to prepare polyimide resin impregnated laminates which exhibit superior flexural strength after aging 100 hours at 700° F.

The preferred impregnating resins are polyamic acids and polyimide forming varnishes which are prepared using (1) an aromatic polycarboxylic component containing from three to four carboxylic groups per molecule, and (2) an aromatic polyamino compound containing at least two primary amino groups per molecule. These materials are well known to those skilled in the art and are described at length in many U.S. Pat. Nos. such as 3,190,856; 3,260,691; 3,347,808; 3,179,614; 3,179,633; and 3,179,634 which are incorporated herein by reference.

The especially preferred impregnating materials are polyimide forming varnishes which comprise a dialkyl ester of benzophenone tetracarboxylic acid and an aromatic diamine. These varnishes are described in detail in U.S. Pat. No. 3,347,808.

Obviously, many modifications and variations are possible in the light of the above teachings. It is therefore to be understood that, within the scope of the appended claims, the invention may be practiced otherwise than as specifically described.

WHAT IS CLAIMED IS:

1. In the method for preparing polyimide composites from amino silane finished hard drape glass cloth and a polyimide forming resin which method comprises impregnating the finished glass cloth with a polyimide forming resin and then curing the impregnated cloth into a composite; the improvement which comprises:
   A. treating the hard drape cloth with water having a temperature of from 180° C. to 0° C. for times of from 2 minutes to 96 hours; and then
   B. drying the treated glass cloth prior to the resin impregnating and curing steps.

2. The improved method as in claim 1 wherein the cloth is soaked in boiling water for at least 30 minutes.

3. The improved method as in claim 1 wherein the cloth is soaked in water at room temperature for at least two hours.

4. The improved method as in claim 1 wherein the cloth is finished with an amino propyl triethoxy silane finish.

5. The improved method as in claim 1 wherein the polyimide forming resin is a polyamide acid.

6. In the method for preparing polyimide composites from amino silane finished hard drape glass cloth and a polyimide forming resin which method comprises impregnating the finished glass cloth with a polyimide forming varnish comprising an alkyl diester of benzophenone tetracarboxylic acid and an aromatic diamine wherein the alkyl group contains from one to four carbon atoms, and then curing the impregnated cloth into a composite; the improvement which comprises:
   A. treating the hard drape cloth with water having a temperature of from 180° C. to 0° C. for times of from 2 minutes to 96 hours; and then
   B. drying the treated glass cloth prior to the varnish impregnating and curing steps.

7. The improved method of claim 6 wherein the polyimide forming varnish comprises a diethyl ester of benzophenone tetracarboxylic acid and m-phenylene diamine.

* * * * *